US011482076B2

(12) United States Patent
Meyer

(10) Patent No.: US 11,482,076 B2
(45) Date of Patent: Oct. 25, 2022

(54) GAMING DEVICE WITH DYNAMICALLY AWARDABLE PRIZES BASED ON COLLECTIVE POSITION STATE OF SYMBOLS

(71) Applicant: Aristocrat Technologies Australia Pty Limited, North Ryde (AU)

(72) Inventor: Jason Meyer, Wyoming (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

(21) Appl. No.: 17/079,104

(22) Filed: Oct. 23, 2020

(65) Prior Publication Data
US 2021/0279999 A1 Sep. 9, 2021

(30) Foreign Application Priority Data
Mar. 4, 2020 (AU) ................................ 2020900656

(51) Int. Cl.
*G07F 17/32* (2006.01)
*G06F 7/58* (2006.01)

(52) U.S. Cl.
CPC .......... *G07F 17/3267* (2013.01); *G06F 7/588* (2013.01); *G07F 17/3213* (2013.01); *G07F 17/3262* (2013.01)

(58) Field of Classification Search
CPC .. G06F 7/588; G07F 17/3213; G07F 17/3262; G07F 17/3267
See application file for complete search history.

(56) References Cited

U.S. PATENT DOCUMENTS

| 5,265,874 | A | | 11/1993 | Dickinson |
| 5,489,101 | A | | 2/1996 | Moody |
| 5,697,843 | A | | 12/1997 | Manship |
| 5,833,537 | A | * | 11/1998 | Barrie ................. G07F 17/3265 463/21 |

(Continued)

FOREIGN PATENT DOCUMENTS

| CA | 2085460 A1 | 6/1994 |
| CA | 2504494 A1 | 10/2006 |

(Continued)

OTHER PUBLICATIONS

AU Patent Examination Report for AU Application No. 2016203481, dated Nov. 20, 2017. 3 Pages.

(Continued)

*Primary Examiner* — Justin L Myhr
(74) *Attorney, Agent, or Firm* — McAndrews, Held & Malloy, Ltd.

(57) ABSTRACT

An electronic gaming device having a display and a game controller, and playing an iterative game. During the iterative game, the game controller controls the display to display a set of columns of symbol positions, and selects symbols for display at the symbol positions. When a configurable symbol is selected for display in one of the columns, the game controller adjusts at least a portion of a background of the one of the columns. When the one column is completely filled with modified backgrounds, the electronic gaming device presents an award based on a prize associated with the one column, in addition to any prizes presented as a result of payline combinations.

20 Claims, 18 Drawing Sheets

(56) References Cited

U.S. PATENT DOCUMENTS

| | | | |
|---|---|---|---|
| 5,984,779 A | 11/1999 | Bridgeman | |
| 6,652,380 B1 | 11/2003 | Luciano | |
| 6,962,530 B2 | 11/2005 | Jackson | |
| 7,036,012 B2 | 4/2006 | Charrin | |
| 7,094,149 B2 | 8/2006 | Walker | |
| 2002/0161645 A1 | 10/2002 | Walker | |
| 2002/0183105 A1 | 12/2002 | Cannon | |
| 2003/0078094 A1 | 4/2003 | Gatto | |
| 2003/0211886 A1 | 11/2003 | Buchanan | |
| 2004/0147309 A1 | 7/2004 | Chamberlain | |
| 2005/0054434 A1* | 3/2005 | Baerlocher | G07F 17/3253 463/25 |
| 2005/0059455 A1* | 3/2005 | Gerrard | G07F 17/32 463/16 |
| 2005/0082758 A1 | 4/2005 | Sklansky | |
| 2005/0130728 A1 | 6/2005 | Nguyen | |
| 2005/0143169 A1 | 6/2005 | Nguyen | |
| 2005/0167924 A1 | 8/2005 | Sklansky | |
| 2005/0282626 A1 | 12/2005 | Manfredi | |
| 2006/0066051 A1 | 3/2006 | Nicely | |
| 2006/0068897 A1 | 3/2006 | Sanford | |
| 2006/0073888 A1 | 4/2006 | Nguyen | |
| 2006/0142078 A1 | 6/2006 | Walker | |
| 2006/0186600 A1 | 8/2006 | Sklansky | |
| 2006/0189367 A1 | 8/2006 | Nguyen | |
| 2006/0211475 A1 | 9/2006 | Walker | |
| 2006/0211476 A1 | 9/2006 | Walker | |
| 2006/0211477 A1 | 9/2006 | Walker | |
| 2006/0211493 A1 | 9/2006 | Walker | |
| 2006/0242020 A1 | 10/2006 | Walker | |
| 2007/0010320 A1 | 1/2007 | Toyoda | |
| 2007/0271194 A1 | 11/2007 | Walker | |
| 2008/0176646 A1 | 7/2008 | Kelly | |
| 2008/0274783 A1 | 11/2008 | Walker | |
| 2008/0274792 A1 | 11/2008 | Walker | |
| 2009/0082082 A1 | 3/2009 | Carr-Gregg | |
| 2010/0222132 A1 | 9/2010 | Sanford | |
| 2010/0248807 A1* | 9/2010 | Mizue | G07F 17/34 463/20 |
| 2011/0117989 A1* | 5/2011 | Kennedy | G07F 17/34 463/20 |
| 2011/0183745 A1 | 7/2011 | Gagner | |
| 2011/0201408 A1 | 8/2011 | Gagner | |
| 2016/0140795 A1 | 5/2016 | Fong | |
| 2019/0051114 A1* | 2/2019 | Cong | G07F 17/3267 |
| 2020/0312094 A1* | 10/2020 | Halvorson | G07F 17/3244 |
| 2020/0364985 A1 | 11/2020 | Meyer | |

FOREIGN PATENT DOCUMENTS

| | | |
|---|---|---|
| GB | 1447550 | 8/1976 |
| WO | 2005048164 A1 | 5/2005 |
| WO | 2006033840 A2 | 3/2006 |
| WO | 2006072942 A2 | 7/2006 |

OTHER PUBLICATIONS

Office Action dated Mar. 25, 2020, for U.S. Appl. No. 12/976,270 (pp. 1-23).
Notice of Allowance dated Jul. 22, 2020 for U.S. Appl. No. 12/976,270.
AU Examination Report No. 1 for App. No. AU2020201414, dated Oct. 13, 2020, 4 pages.
"Prize Disk" feature, Wolf Ridge slot machine, YouTube video: https://www.youtube.com/watch?v=B0HF2rWez1w, Nov. 23, 2017, IGT, 1 page.

* cited by examiner

GAMING DEVICE WITH DYNAMICALLY AWARDABLE PRIZES BASED ON COLLECTIVE POSITION STATE OF SYMBOLS

RELATED APPLICATION(S)

The present application claims priority to Australian Provisional Patent Application No. 2020900656, filed Mar. 4, 2020, and entitled "Gaming Device with Dynamic Awards Based on Symbol Position State," which is hereby incorporated by reference in its entirety.

BACKGROUND

The present application relates to a gaming device, a method of operating a gaming device, and a system which enable dynamic awards to be made based on a symbol position state.

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

Example embodiments provide a gaming device, a method of operating a gaming device, and a gaming system where dynamic awards are updated for respective ones of a plurality of columns of symbol positions when prize symbols having prize amounts (e.g. "cash on reel" symbols) land in the respective columns. Each position where a prize symbol lands is made active and if all symbol positions of a column become active, the current total of the dynamic award is made.

In an example embodiment, there is provided a gaming device comprising a display, a processor, and a memory storing (i) data defining a plurality of columns of symbol positions, (ii) data defining a plurality of reel strips, each reel strip comprising a first category of symbols and second category of symbols and being associated with a one of the plurality of columns, (iii) an active position state defining which symbol positions of a respective column are currently active; (iv) a prize state for each column, and (iii) instructions. When the instructions are executed by the processor, they cause the processor to, in each game instance, control the display to display the plurality of columns of symbol positions, and select symbols from the plurality of reel strips for display in the plurality of columns of symbol positions. Upon one or more symbols of the first category being selected, the instruction cause the processor to update the active position state to register each symbol position for which a first category symbol is selected as active, and update the prize state of each column for which a first category symbol is selected to incorporate each prize associated with selected first category symbol. Upon all of the symbol positions of a respective column becoming active, the instructions cause the processor to make an award based on the prize state of the respective column, reinitialize the active position state, and reinitialize the prize state of each of the columns.

In another example embodiment, there is provided a method of operating a gaming device comprising a display and a memory storing (i) data defining a plurality of columns of symbol positions, (ii) data defining a plurality of reel strips, each reel strip comprising a first category of symbols and second category of symbols and being associated with a one of the plurality of columns, (iii) an active position state defining which symbol positions of a respective column are currently active; and (iv) a prize state for each column. The method comprises, in each game instance, controlling the display to display the plurality of columns of symbol positions and selecting symbols from the plurality of reel strips for display in the plurality of columns of symbol positions. Upon one or more symbols of the first category being selected, the method comprises updating the active position state to register each symbol position for which a first category symbol is selected as active, and updating the prize state of each column for which a first category symbol is selected to incorporate each prize associated with selected first category symbol. Upon all of the symbol positions of a respective column becoming active, the method comprises making an award based on the prize state of the respective column, reinitializing the active position state, and reinitializing the prize state of each of the columns.

In another example embodiment, there is provided a system comprising one or more processors, and at least one memory storing (i) data defining a plurality of columns of symbol positions, (ii) data defining a plurality of reel strips, each reel strip comprising a first category of symbols and second category of symbols and being associated with a one of the plurality of columns, (iii) an active position state defining which symbol positions of a respective column are currently active; (iv) a prize state for each column, and (iii) instructions. When the instructions are executed by the one or more processors, cause the one or more processors to, in each game instance, control a display to display the plurality of columns of symbol positions, and select symbols from the plurality of reel strips for display in the plurality of columns of symbol positions. The instructions cause the one or more processors to upon one or more symbols of the first category being selected, update the active position state to register each symbol position for which a first category symbol is selected as active, and update the prize state of each column for which a first category symbol is selected to incorporate each prize associated with selected first category symbol. The instructions cause the one or more processors to upon all of the symbol positions of a respective column becoming active, make an award based on the prize state of the respective column, reinitialize the active position state, and reinitialize the prize state of each of the columns.

DETAILED DESCRIPTION

Embodiments of the present disclosure represent an improvement in the art of electronic gaming machines, devices, systems, and software for such electronic gaming machines, devices, or systems. For example, at least some embodiments of the present disclosure employ a display that provides a visual modification of backgrounds in columns of display positions during an iterative game to award a prize associated with one of the columns of display positions. In such embodiments, each of the columns of display positions is associated with an increasable prize. When a special symbol is displayed, the background associated with the display position that displays the special symbol is modified. If the special symbol also includes a symbol prize, the game controller increases the increasable prize. When the backgrounds of the one or more of the columns have been completely modified, the gaming device presents the increasable prize, in addition to any prizes presented resulted from any payline winnings.

Further, the visual modification also provides a simplified player experience such that the player may only need to focus on changing of colors or patterns, or expansions of the backgrounds, without being overly burdened by complicated calculations. Further, embodiments of the present disclosure also provide certain payouts that are not conventional, as those that utilize memory to store symbol data for multiple symbol sets, such that one or more of these multiple sets is used to determine symbols to be selected in various symbol positions and in various columns. Thus, embodiments of the present disclosure are not merely new game rules or simply new display patterns, but provide technological improvements in the art of electronic gaming machines and software for such electronic gaming machines. Moreover, the above example is not intended to be limiting, but merely exemplary of technologic improvements provided by some embodiments of the present disclosure. Technological improvements of other embodiments are readily apparent to those of ordinary skill in the art in light of the present disclosure.

Figure 1:
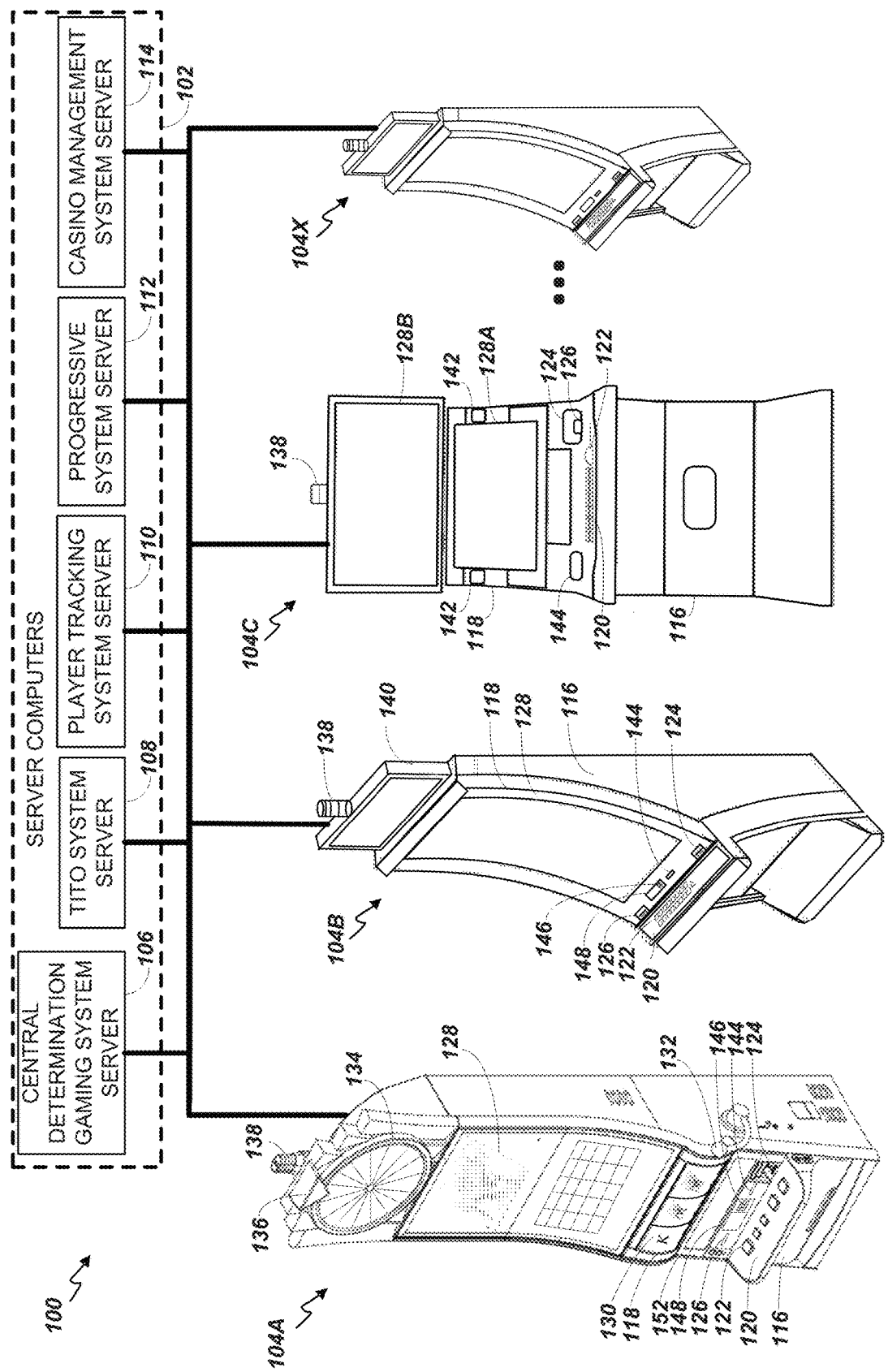
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
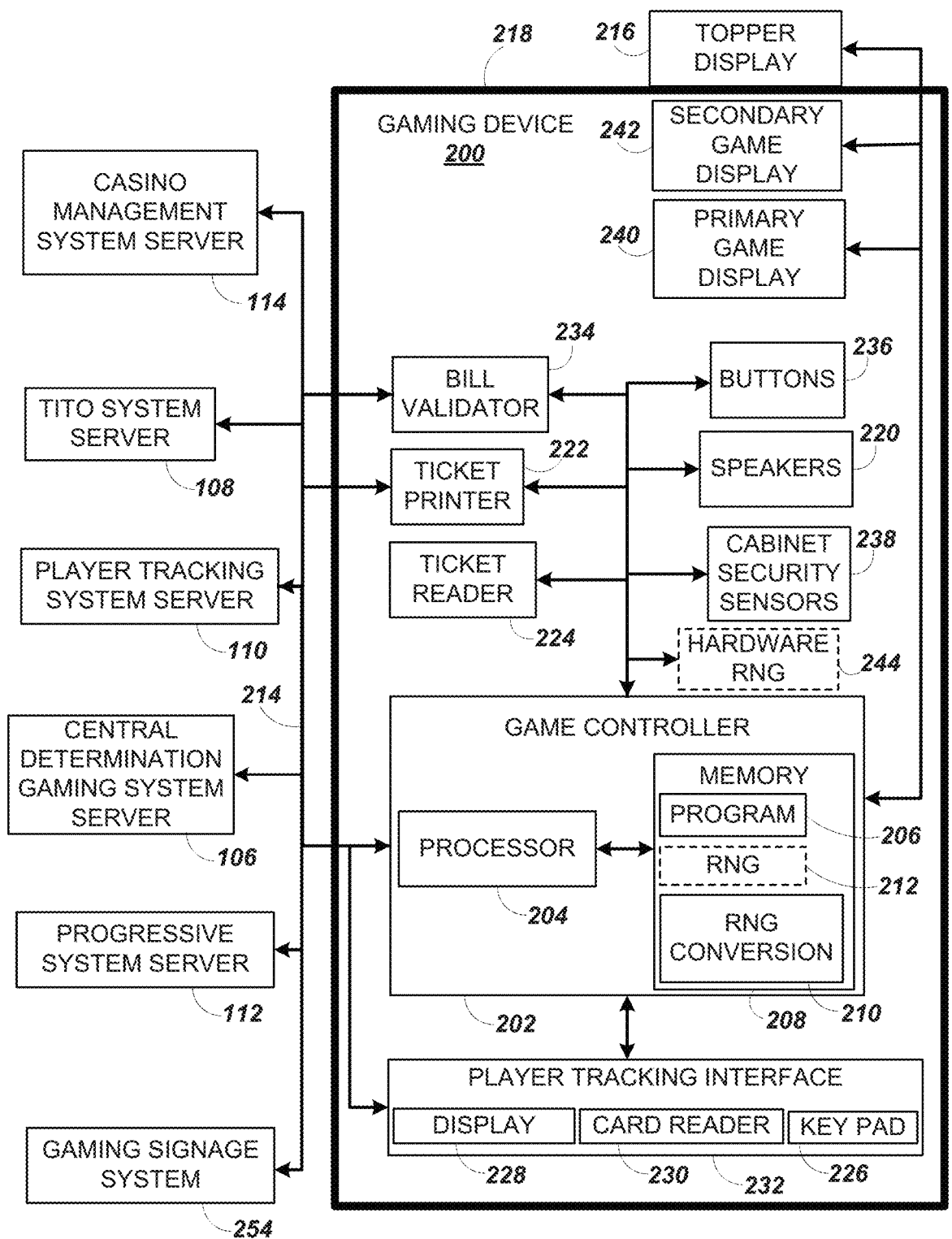
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2A also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2A. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2A are examples to facilitate ease of description and explanation.

Figure 2B:
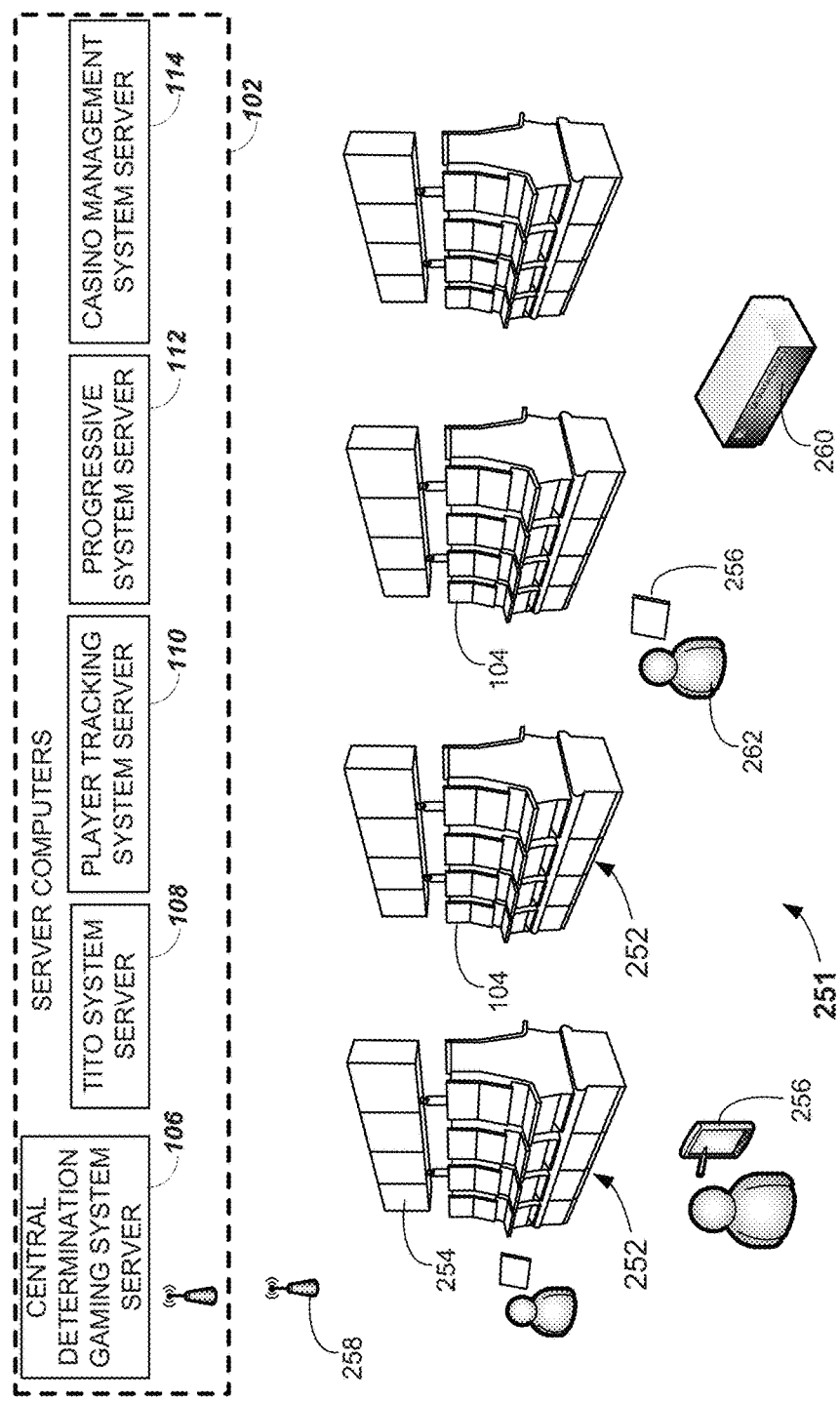
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
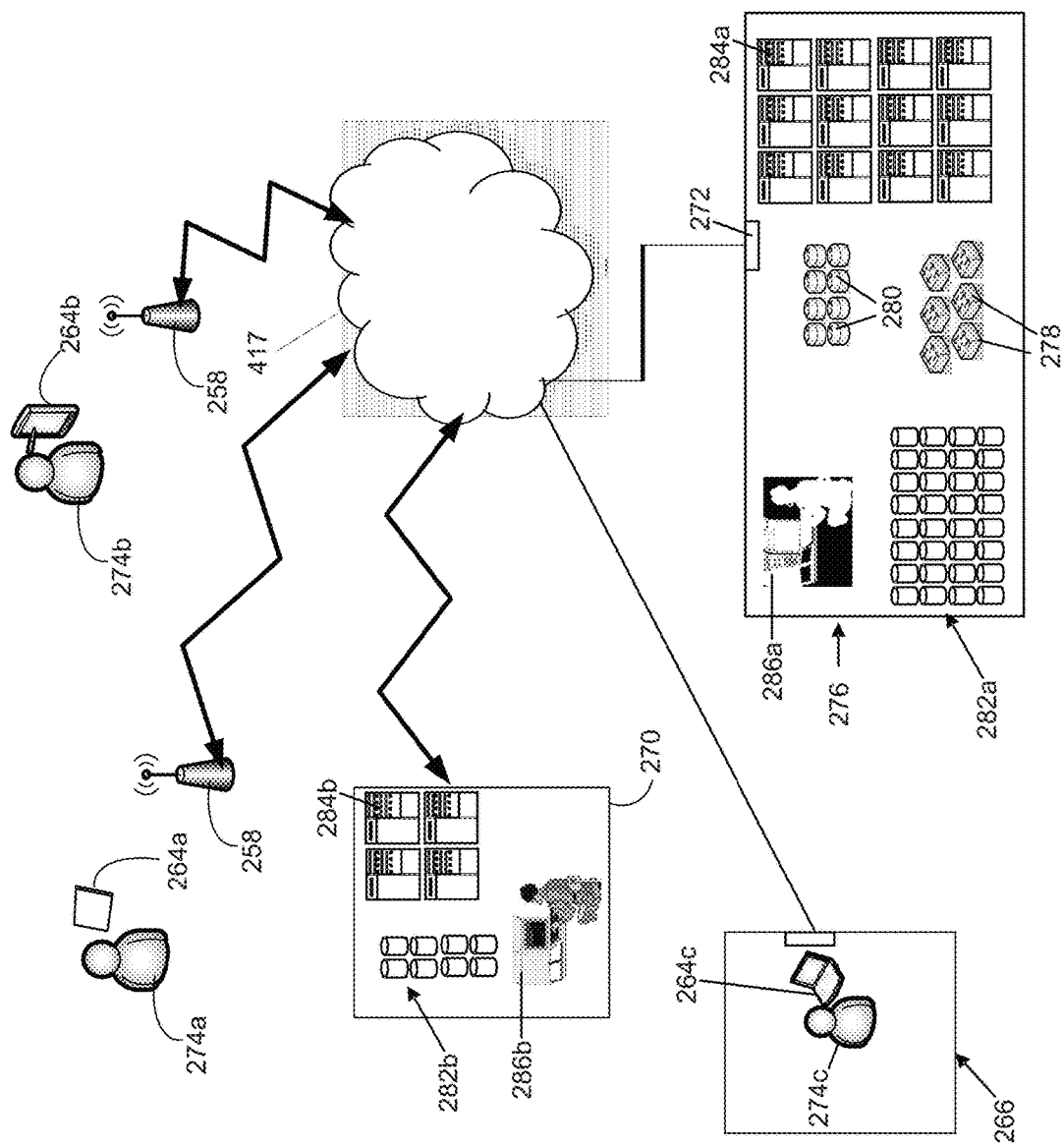
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 2D:
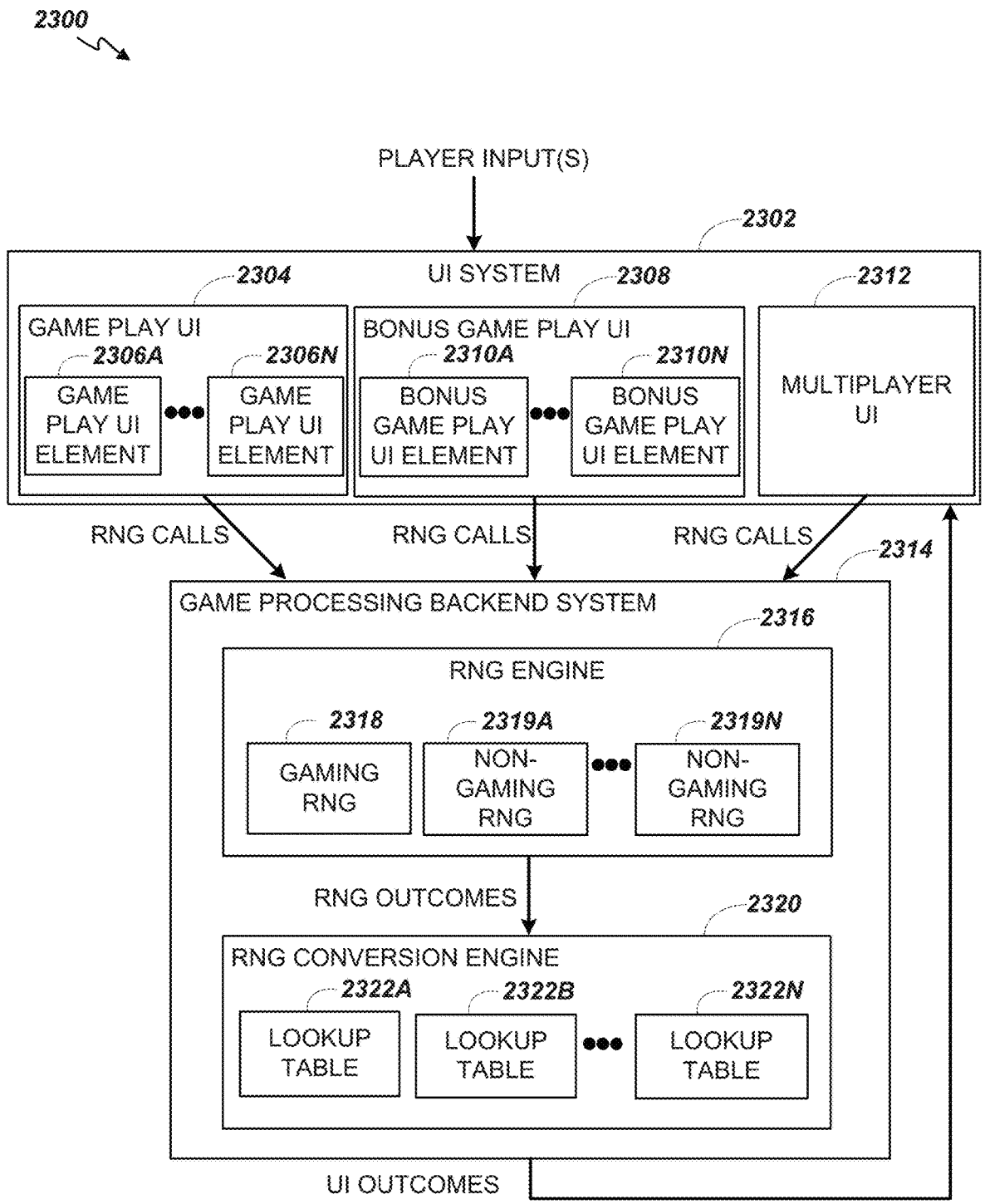
FIG. 2D illustrates, in block diagram form, an implementation of a game processing architecture algorithm that implements a game processing pipeline for the play of a game in accordance with various implementations described herein.

FIG. 2D illustrates, in block diagram form, an implementation of a game processing architecture 2300 that implements a game processing pipeline for the play of a game in accordance with various implementations described herein. As shown in FIG. 2D, the gaming processing pipeline starts with having a UI system 2302 receive one or more player inputs for the game instance. Based on the player input(s), the UI system 2302 generates and sends one or more RNG calls to a game processing backend system 2314. Game processing backend system 2314 then processes the RNG calls with RNG engine 2316 to generate one or more RNG outcomes. The RNG outcomes are then sent to the RNG conversion engine 2320 to generate one or more game outcomes for the UI system 2302 to display to a player. The game processing architecture 2300 can implement the game processing pipeline using a gaming device, such as gaming devices 104A-104X and 200 shown in FIGS. 1 and 2A, respectively. Alternatively, portions of the gaming processing architecture 2300 can implement the game processing pipeline using a gaming device and one or more remote gaming devices, such as central determination gaming system server 106 shown in FIG. 1.

The UI system 2302 includes one or more UIs that a player can interact with. The UI system 2302 could include one or more game play UIs 2304, one or more bonus game play UIs 2308, and one or more multiplayer UIs 2312, where each UI type includes one or more mechanical UIs and/or graphical UIs (GUIs). In other words, game play UI 2304, bonus game play UI 2308, and the multiplayer UI 2312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 2D as an example, the different UI elements are shown as game play UI elements 2306A-2306N and bonus game play UI elements 2310A-2310N.

The game play UI 2304 represents a UI that a player typically interfaces with for a base game. During a game instance of a base game, the game play UI elements 2306A-2306N (e.g., GUI elements depicting one or more virtual reels) are shown and/or made available to a user. In a subsequent game instance, the UI system 2302 could transition out of the base game to one or more bonus games. The bonus game play UI 2308 represents a UI that utilizes bonus game play UI elements 2310A-2310N for a player to interact with and/or view during a bonus game. In one or more implementations, at least some of the game play UI element 2306A-2306N are similar to the bonus game play UI elements 2310A-2310N. In other implementations, the game play UI element 2306A-2306N can differ from the bonus game play UI elements 2310A-2310N.

FIG. 2D also illustrates that UI system 2302 could include a multiplayer UI 2312 purposed for game play that differs or is separate from the typical base game. For example, multiplayer UI 2312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 2316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 2D does not explicitly depict that multiplayer UI 2312 includes UI elements, multiplayer UI 2312 could also include one or more multiplayer UI elements.

Based on the player inputs, the UI system 2302 could generate RNG calls to a game processing backend system 2314. As an example, the UI system 2302 could use one or more application programming interfaces (APIs) to generate the RNG calls. To process the RNG calls, the RNG engine 2316 could utilize gaming RNG 2318 and/or non-gaming RNGs 2319A-2319N. Gaming RNG 2318 could corresponds to RNG 212 or hardware RNG 244 shown in FIG. 2A. As previously discussed with reference to FIG. 2A, gaming RNG 2318 often performs specialized and non-generic operations that comply with regulatory and/or game requirements. For example, because of regulation requirements, gaming RNG 2318 could correspond to RNG 212 by being a cryptographic RNG or pseudorandom number generator (PRNG) (e.g., Fortuna PRNG) that securely produces random numbers for one or more game features. To securely generate random numbers, gaming RNG 2318 could collect random data from various sources of entropy, such as from an operating system (OS) and/or a hardware RNG (e.g., hardware RNG 244 shown in FIG. 2A). Alternatively, non-gaming RNGs 2319A-2319N may not be cryptographically secure and/or be computationally less expensive. Non-gaming RNGs 2319A-2319N can, thus, be used to generate outcomes for non-gaming purposes. As an example, non-gaming RNGs 2319A-2319N can generate random numbers for generating random messages that appear on the gaming device.

The RNG conversion engine 2320 processes each RNG outcome from RNG engine 2316 and converts the RNG outcome to a UI outcome that is feedback to the UI system 2302. With reference to FIG. 2A, RNG conversion engine 2320 corresponds to RNG conversion engine 210 used for game play. As previously described, RNG conversion engine 2320 translates the RNG outcome from the RNG 212 to a game outcome presented to a player. RNG conversion engine 2320 utilizes one or more lookup tables 2322A-2322N to regulate a prize payout amount for each RNG outcome and how often the gaming device pays out the derived prize payout amounts. In one example, the RNG conversion engine 2320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 2314 sends the UI outcome to the UI system 2302. Examples of UI outcomes are symbols to display on a video reel or reel stops for a mechanical reel. In one example, if the UI outcome is for a base game, the UI system 2302 updates one or more game play UI elements 2306A-2306N, such as symbols, for the game play UI 2304. In another example, if the UI outcome is for a bonus game, the UI system could update one or more bonus game play UI elements 2310A-2310N (e.g., symbols) for the bonus game play UI 2308. In response to updating the appropriate UI, the player may subsequently provide additional player inputs to initiate a subsequent game instance that progresses through the game processing pipeline.

In an embodiment, a method 500 of operating a gaming device begins, at step 505 with receipt of a wager as described above.

Figure 10:
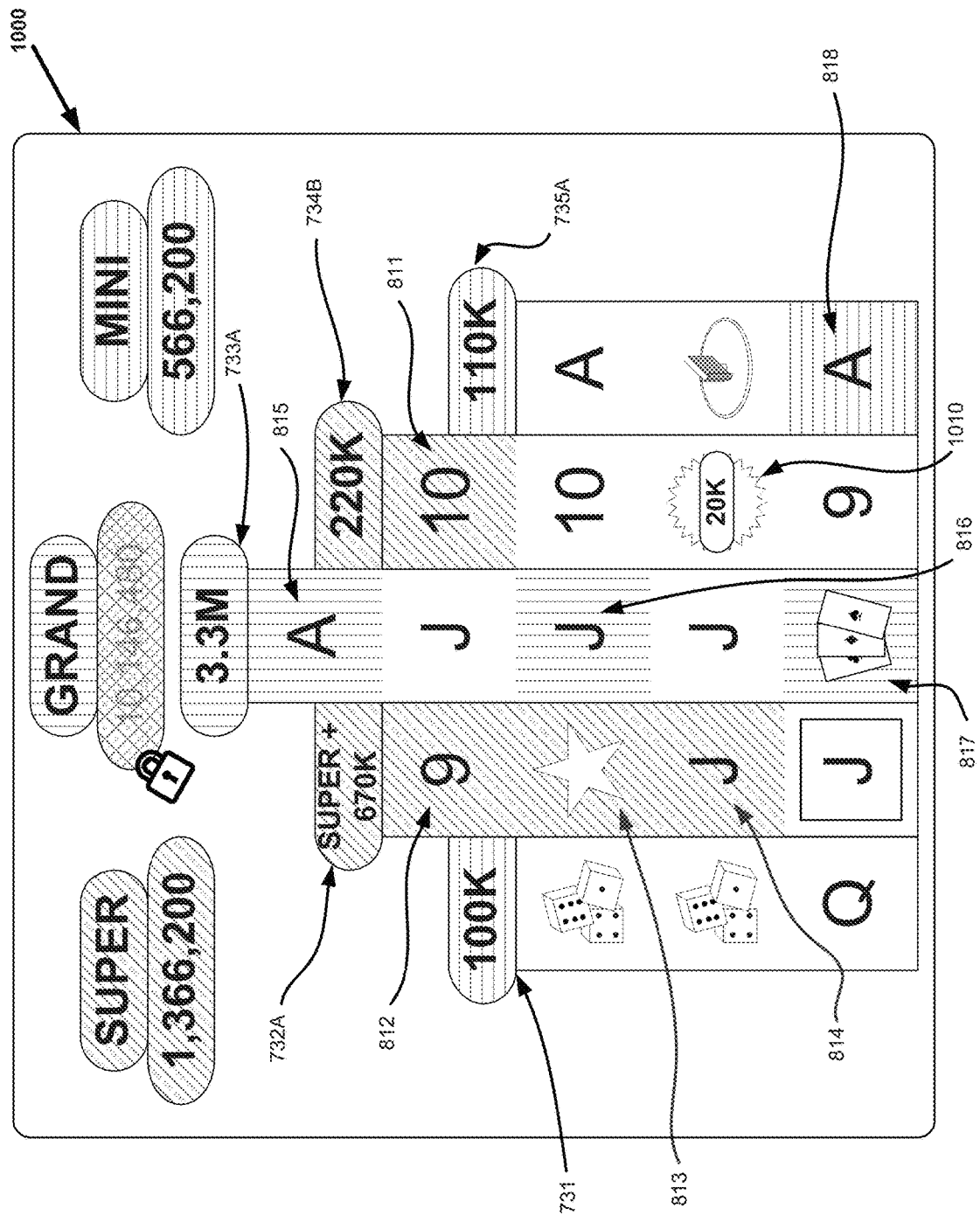

At step 507, the processor 204 controls the display to display active symbol positions based on the received wager. In an example, there are a plurality of active position states corresponding to different wager levels. In an example, if the wager is same as the last wager, the processor 204 controls the display to display the outcome of the last game instance but if the wager has changed, the processor 204 retrieves the active position state corresponding to the received wager and controls the display to display a plurality of symbol positions on the display based on the active position state. In the examples, described below, that a position is active is displayed by changing the color or pattern of backgrounds behind the symbols. Referring, for example, to FIG. 10, a blue or horizontally-patterned background is used in the first column 721 and the fifth column 725 of symbol positions such as horizontally-patterned background 818; a green or diagonally-patterned background is used in the second column 722 and the fourth column 724 of symbol positions such as diagonally-patterned backgrounds 812, 813, and 814; and a red or vertically-patterned background is used in the third column 723 of symbol positions such as vertically-patterned backgrounds 815, 816, and 817. The remaining backgrounds are black (shown as blank) to indicated that they are inactive. How a symbol position becomes active will be described in further detail below.

At step 510, the processor sets a set of reel strips for a current game instance based on the active position state in memory 208. In this example, the set of reel strips is set by the processor determining which of two variant reel strips is to be used to select symbols for the third column 723 of symbol positions. In this example, the processor selects symbols from a first reel strip when an active number of symbol positions of the one of the plurality of columns is below a threshold, or symbols from a second reel strip when an active number of symbol positions is above the threshold. In this example, the second reel strip is configured so as to have a lower probability of a symbol of the first category being selected than the first reel strip to thereby control the probability of activation of a further symbol position. In this example, the threshold is set so that the second reel strip is used when four symbol positions are active. In other examples, there may be more than one reel strip associated with one or more of the other columns of symbol positions.

Figure 3:
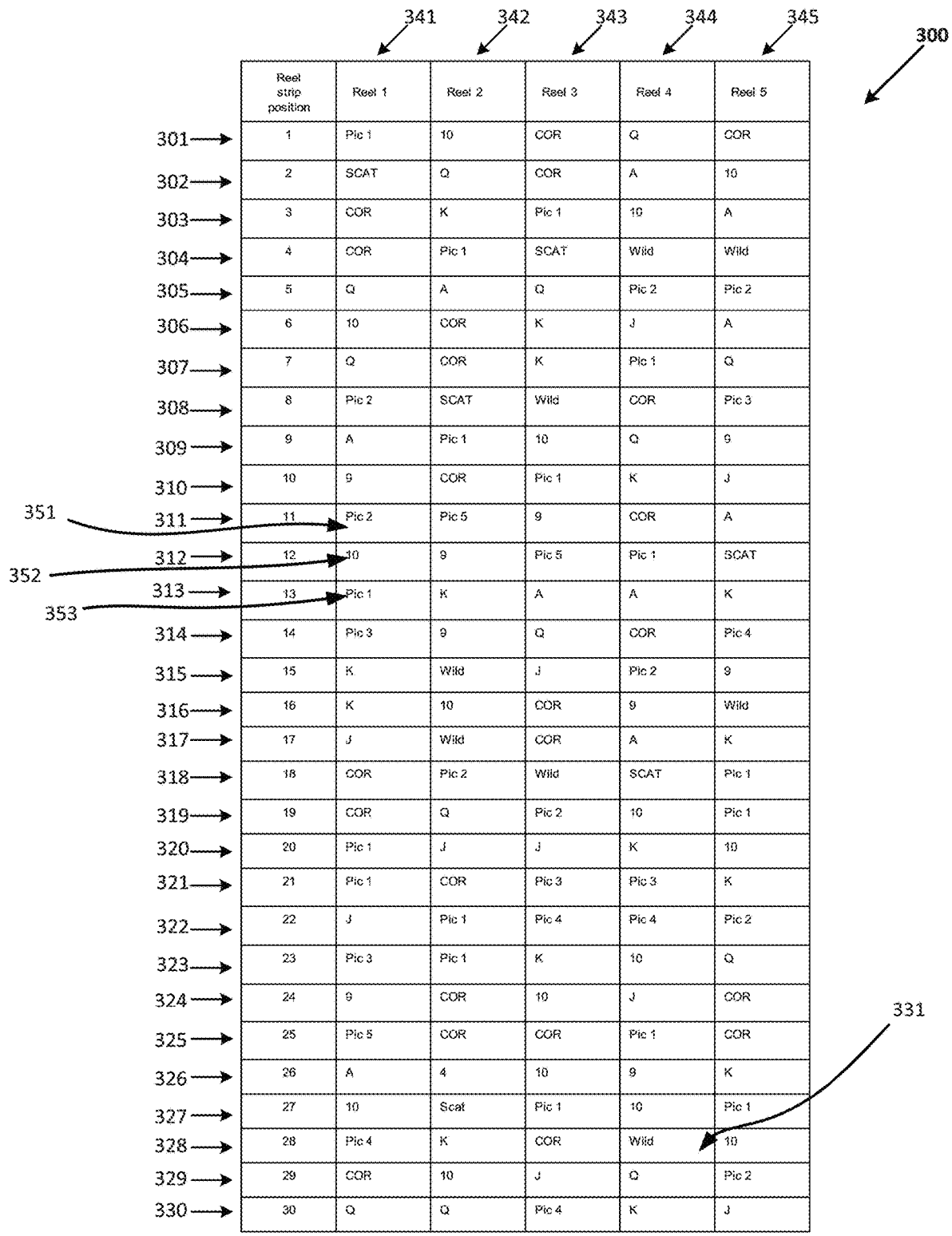
FIG. 3 illustrates an example reel strip layout.

FIG. 3 illustrates an example of a first set 300 of five reel strips 341, 342, 343, 344, 345 of a plurality of reel strips stored in a reel strip data structure in memory 208 where a first variant reel strips is used for the third (or middle) column of symbol positions. In the example, each reel strip has thirty reel strip positions 301-330. Each reel strip position of each reel has a symbol. For example, a "Wild" symbol 331 occupies the twenty-eighth reel strip position 328 of the fourth reel 344. Other reels strips to those illustrated in FIG. 3 can be used, for example, reel strips where two or more wild symbols are placed at consecutive reel strip positions of a reel strip. In other examples, the reel strips could have between 30 and 100 reel strip positions. The actual lengths of the game reel strips depend on factors such as the number of wild symbols (in general, the more wilds there are, the longer the reel strip needs to be to maintain the target RTP), and volatility (in general, the higher the prize value is, the longer the reel strip needs to be to lower the hit rate to maintain the target RTP).

Each of the reel strips 341-345 have configurable symbols—i.e. the "COR" symbols. COR stands for "Cash on Reels" as in this example each configurable symbol is configured with a prize value by processor 204 when symbols are selected at step 515 as described below. In the example, the second variant reel strip associated with the third column of symbol positions has more reel strip positions and fewer COR symbols than third reel strip 343. Further, in some embodiments, one or more columns of symbol positions have different numbers of symbol positions than other column(s). In the example, the symbol positions are arranged in a 3-4-5-4-3 configuration, where the first column and the fifth column each have 3 symbol positions, the second column and the fourth column each have 4 symbol positions, and the third column has 5 symbol positions.

In an example, the values of the assignable prizes depend on an amount wagered, for example they correspond to a base amount multiplied by bet multiplier. In an example, the assignable prizes may be the prizes may be credit amounts, e.g. 10,000, 20,000, or 40,000 credits.

In other examples, the assignable prizes may be cash amounts (e.g. $5, $10, $20, $25) or otherwise defined prizes such a bonus or jackpot prizes.

Figure 6:
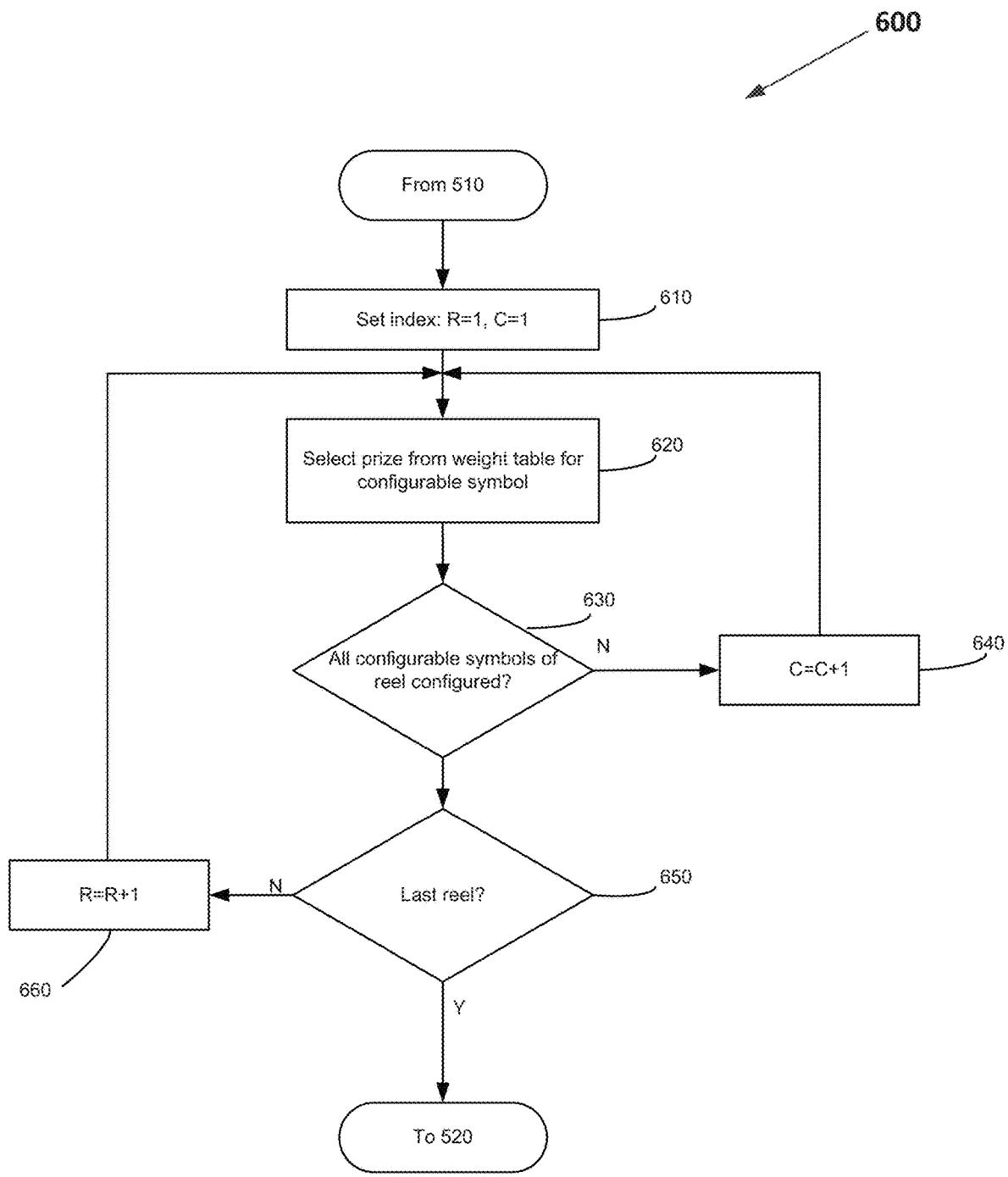
FIG. 6 is a flow chart of a symbol configuration method.

At step 515, the instructions in memory 208 cause processor 204 to conduct an iterative loop 600 shown in FIG. 6. At step 610, the processor sets an index for implementing the loop by setting R=1, C=1, where R is the current reel strip and C is the current configurable symbol. At step 620, processor 204 randomly selects a prize from a weight table associated with the current reel strip using a random value obtained from random number generator 212 and assigns it to the current configurable symbol. At step 630, the processor 204 determines if all configurable symbols of a reel strip have been assigned a prize and if not, at step 640 iterates to the next configurable symbol. If the processor 204 determines at step 630, that all configurable symbols of a reel strip have been assigned a prize and at step 650 that this is not the last reel strip before iterating at step 660 to a different reel strip. Processor 204 then conducts another iterative loop using the weighted table associated with the different reel strip to assign values to the configurable symbols. The process continues until it is determined at step 650 that all reel strips are configured such that the process reverts to step 520.

In an alternative example, prizes are randomly selected by the processor 204 from a table of prizes without replacement to enable control of the number of instances of one or more prizes. Alternatively, certain assignable prizes may be removed from the weighted tables if they are added to the prize totals described below, for example, mini jackpot, super jackpot and grand jackpot prizes may be removed from the weighted tables if they are selected once.

Figure 4:
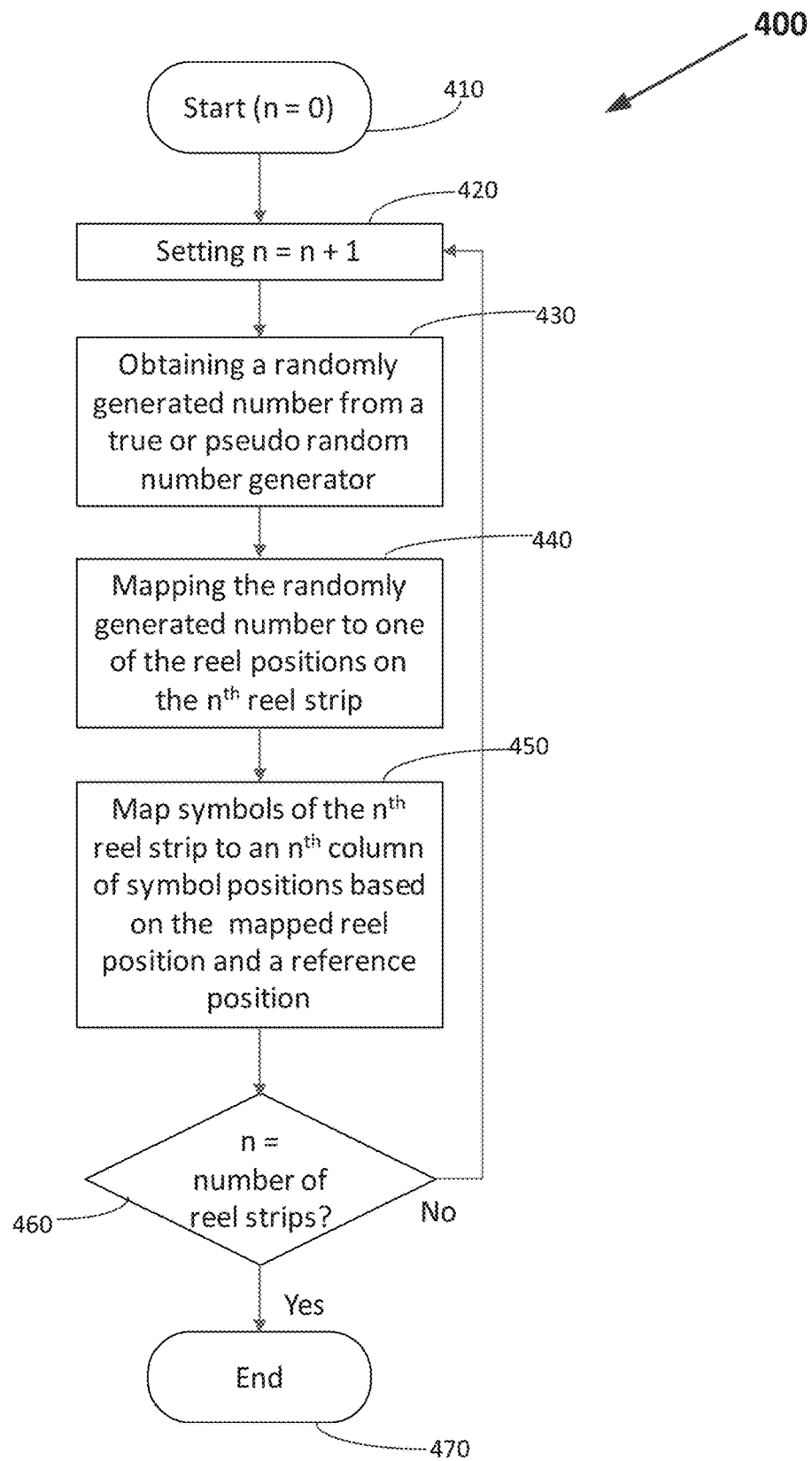
FIG. 4 is a flow chart of a symbol selection method.

At step 520, the processor 204 selects symbols from the configured reel strips. FIG. 4 is a flow chart of an example method 400 carried out by the processor 204 to select symbols from reel strips. At step 410, the processor 204 starts the process of selecting symbols with a counter (n) set at zero as symbols have not yet been selected from any reel strips. At step 420, the processor 204 increments the counter. In the first iteration, the counter is set to 1 to reflect that symbols are to be selected from a first reel strip. At step 430, the processor obtains a randomly generated number from a true or pseudo random number generator 212. At step 440, the processor maps the generated number to one of the reel positions of the nth reel strip. In the first iteration, this is the first reel strip. To map the generated number to one of the reel positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of been selected. In other examples, the ranges may be arranged to weight the relative chances of selecting specific reel strip positions. The reel strips may be of different lengths.

At step 450, the processor 204 maps symbols of the $n^{th}$ reel strip to and $n^{th}$ column of symbol display positions based on the mapped reel position and a reference position. In an example, the reference position is the bottom position of the symbol positions of each column of symbol positions. In this example, the selected reel position (and hence the symbol at this position) is mapped to the bottom symbol position of the column. In an example, there are two other symbol positions in the first and fifth columns of symbol positions and hence symbols at two neighboring reel strip positions are also mapped to the symbol positions of the column. Referring to the example reel strips of FIG. 3, if the value returned by the RNG 212 is mapped to reel position 313 for use with the first column 721 or the fifth column 725, then for the first reel strip 341, "Pic 1" symbol 353 is mapped to a bottom symbol position, "10" symbol 352 is mapped to a middle symbol position, and "Pic 2" symbol 351 is mapped to a top symbol position. In the same way, four symbols are selected for the second 722 and fourth 724 columns of symbol positions and five symbols are selected for the third column 723 of symbol positions.

At step 460, the processor 460 determines whether symbols have been selected for all of the reel strips, and if not the processor 204 reverts to step 420 and iterates through steps 430, 440 and 450 until it is determined at step 460 that symbols have been selected from all n reel strips and mapped to all n columns of symbol positions after which the symbol selection process ends 470. In other examples, different numbers of symbols may be mapped to different numbers of symbol positions.

Figure 7:
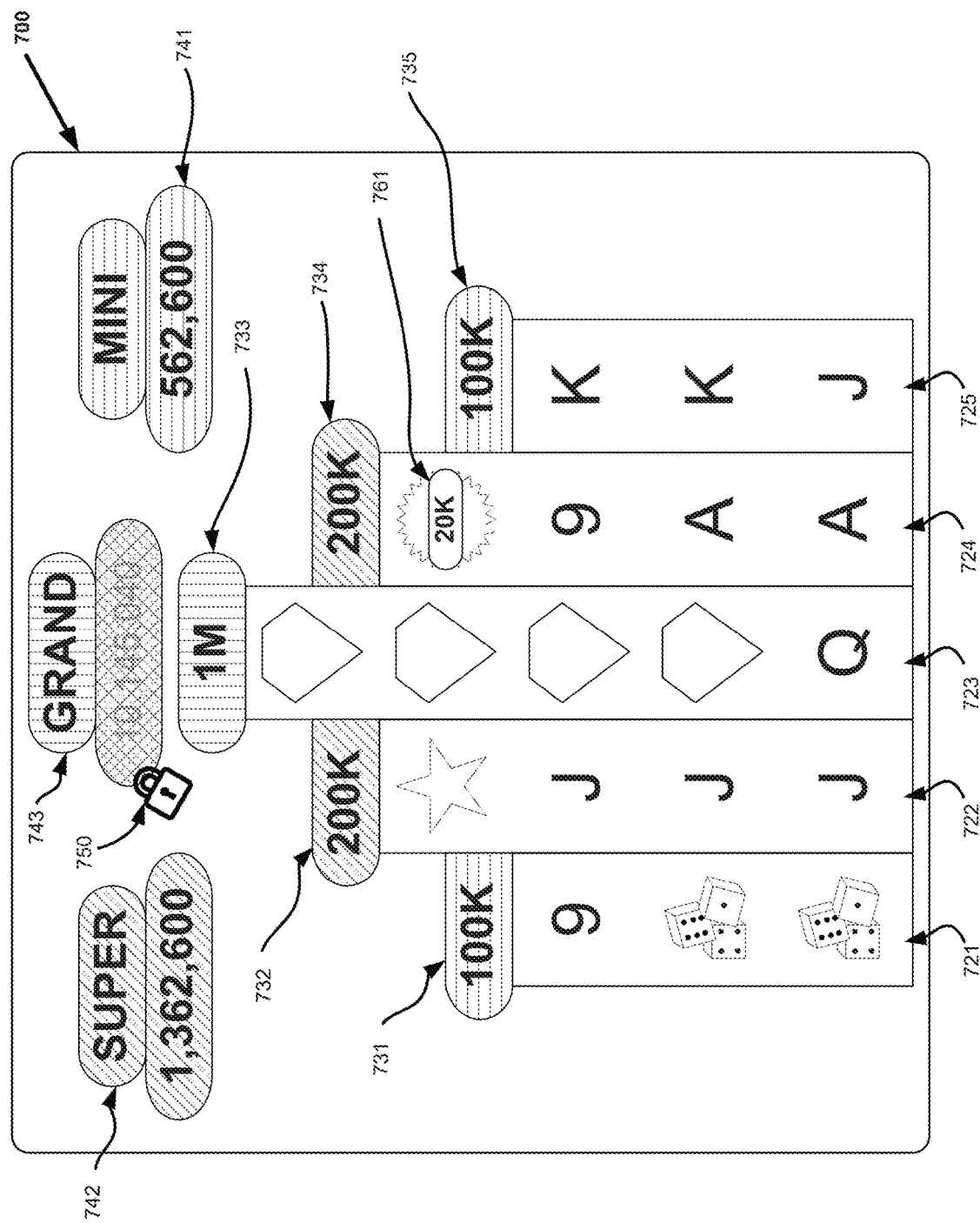
FIGS. 7-15 are example screen displays.
Figure 8:
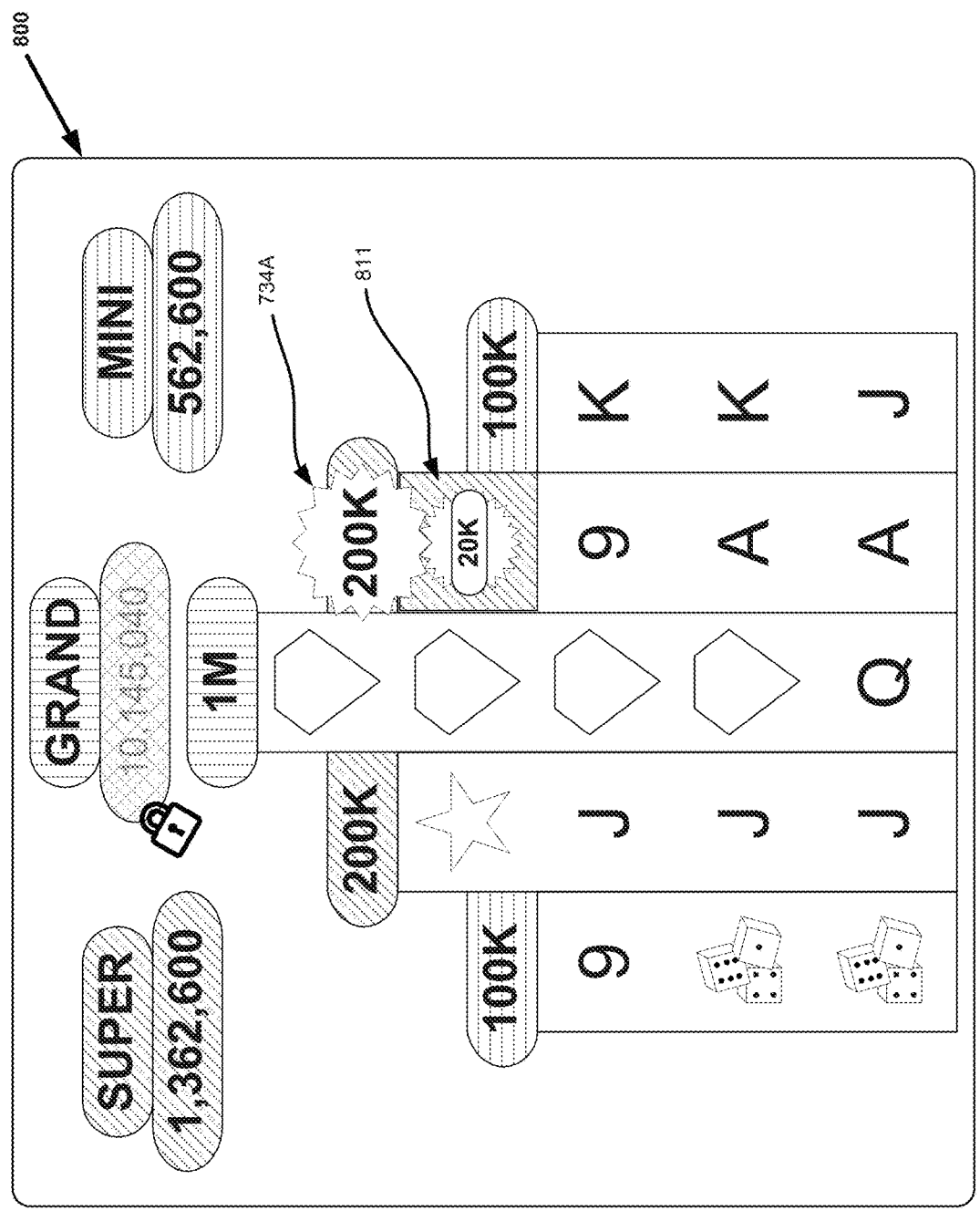

After the symbols of all reel strips have been mapped to symbol positions, the processor 204 controls display 240 to display the mapped or selected symbols at the symbol positions at step 525 (for example, as shown in the example screen display of FIG. 7). At step 530, the processor 204 determines whether the displayed symbols include any configurable symbols and if so proceeds to step 535 of updating the active position state if the symbol position occupied by the (or each) configurable symbol is not already active. For example, FIG. 7 shows that prior to this selection of symbols, no symbol positions were active and that a configurable symbol 761 has been selected for the top symbol position of the fourth column 734. In this case, processor 204 updates the active position state for the current wager in memory 208 and, as shown in FIG. 8, updates the display to incorporate a green (shown as diagonally-patterned) background 811 that indicates that the position is active.

At step 540, the processor 204 updates a prize state associated with each column in memory 208. The prize state is represented by a prize value, which includes a dynamic award value and any jackpot value. As with the position state, there are different prize states for different wagers. FIG. 7 shows an example screen display 700 in a base prize state. Current prize values 731-735 are displayed above columns 721-725 to which they apply respectively. Also shown are progressive jackpot values for a mini jackpot 741 (associated with the first 721 and fifth 725 columns), super jackpot 742 (associated with the second 722 and fourth 724 columns) and grand jackpot 743 (associated with the third column 723). The current value of the grand jackpot 743 is greyed out and a lock symbol 750 is displayed to indicate that the grand jackpot is not available at the current wager amount. As will be explained in further detail below, the progressive jackpot values can be added to a current prize state. These jackpot values can be added to the dynamic award values of the columns with which they are associated.

FIG. 7 also shows, as described above, that a COR symbol 761 having a value of 20K (20,000) has been selected. Accordingly, the prize total 734 which is currently 200K (200,000) will be updated by the processor 204 in memory 208 and the processor 204 will control the display 240 to show the updated value. In the screen display 800 of FIG. 8, the processor 204 animates the prize value 734A to draw the attention of the user to the fact that the prize will be updated, and in in the screen display 900 of FIG. 9, the updated value 734B of 220K (i.e. 200K+20K from the configurable symbol 761) is displayed.

At step 555, the processor 204 determines whether all of the positions of a column are now active and, if not, proceed to step 545, processor 204 evaluates the symbols for winning combinations based on a pay table in memory 208 and an amount wagered per line. In an example, processor 204 evaluates the symbols from the leftmost column 721 to the right most column 725 to find uninterrupted sequences of three or more of the same symbol (or a wild symbol that can substitute for any symbol, or a predetermined symbol combination).

At step 560, the processor 204 determines whether the selected symbols meet a trigger condition for a series of free games, which, for example, may be three or more of a defined symbol such as "Scat" symbol shown on the reel strips of FIG. 3.

At step 570, the processor 204 checks whether a free game counter has a value of zero and if so, the process ends at step 580.

Figure 11:
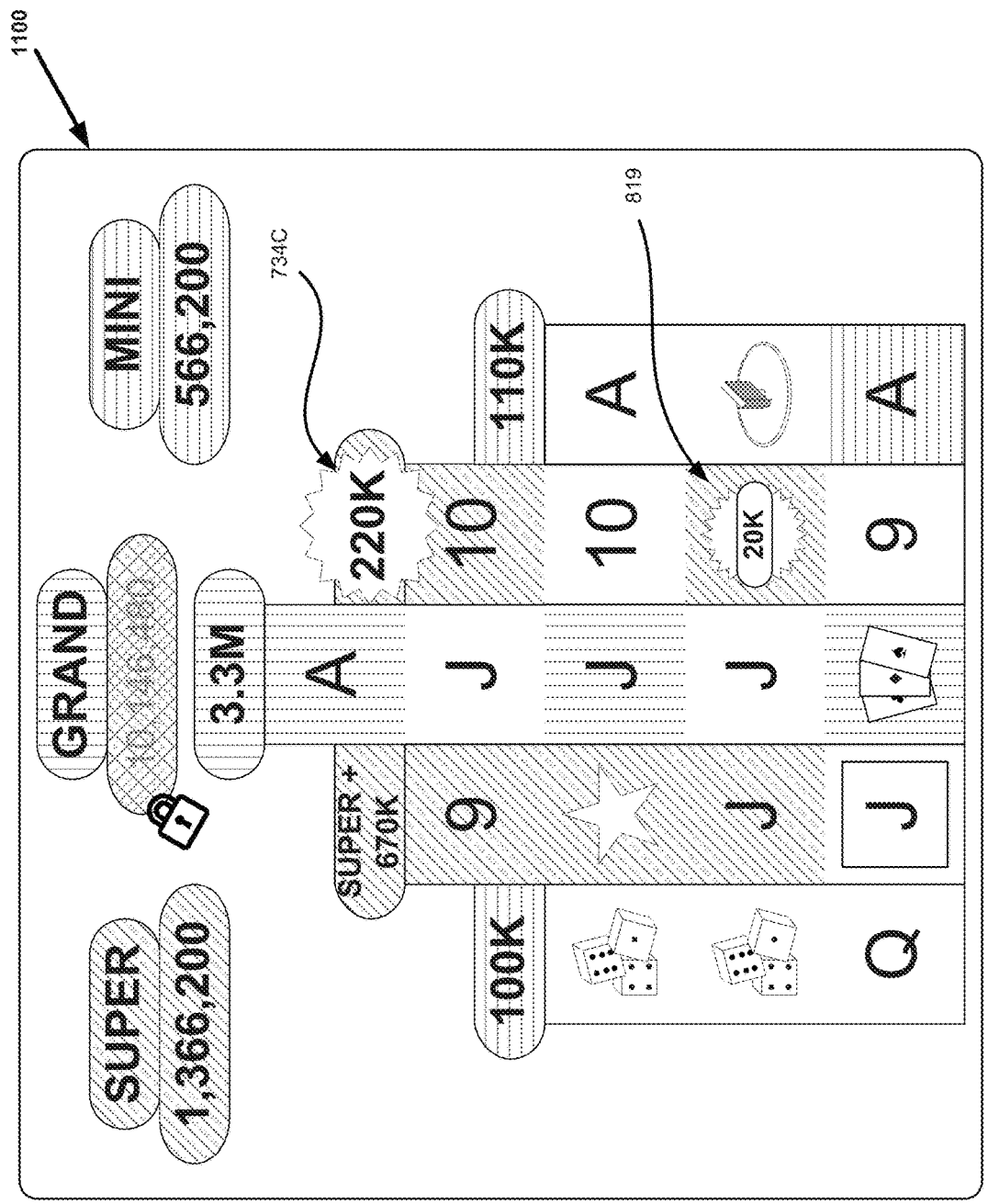
Figure 12:
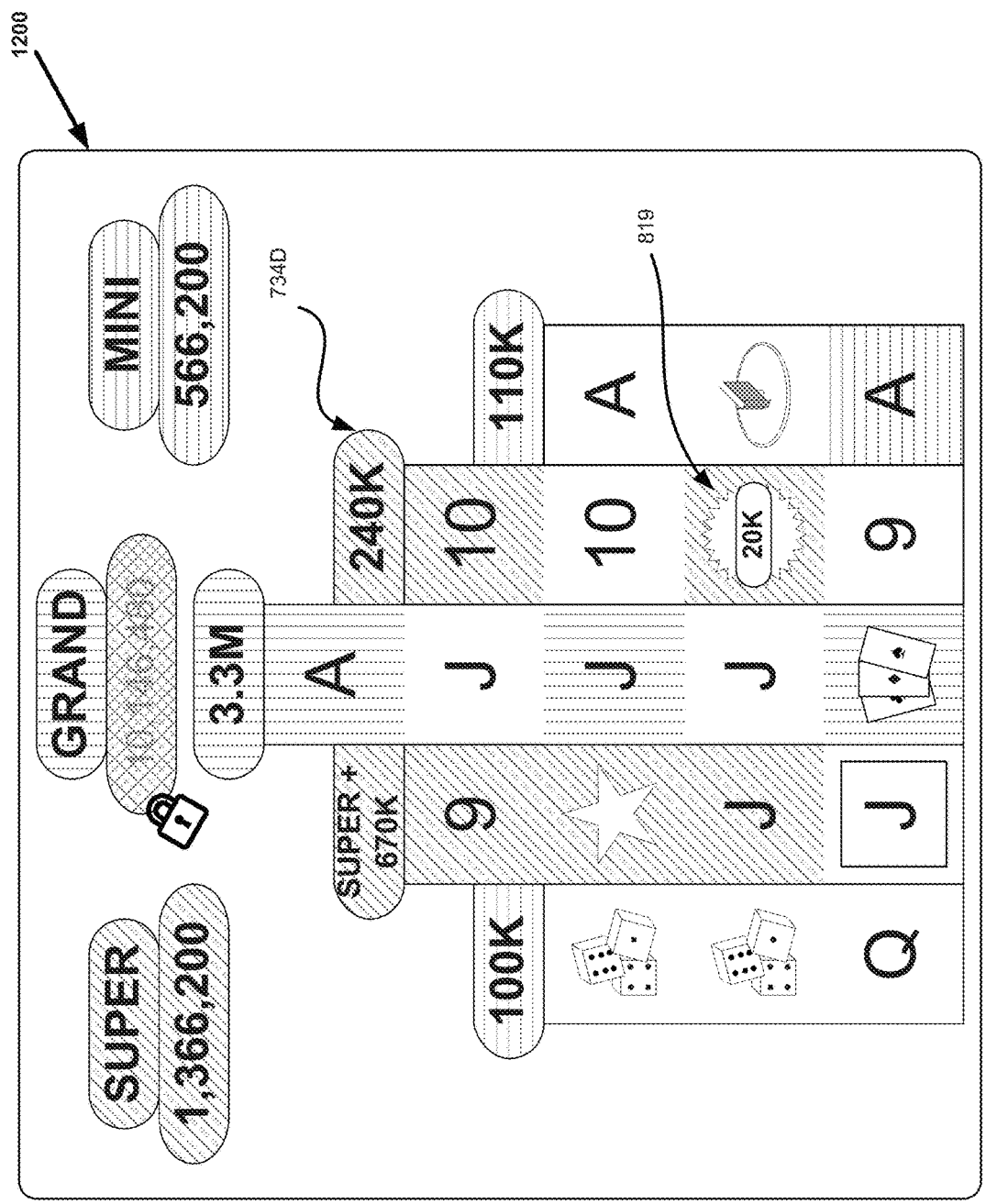

The screen displays 1000, 1100 and 1200 of FIGS. 10-12 show another example of updating of active position states and prize states by the processor 204 at steps 535, 540.

In FIG. 10, there are eight active symbol positions 811-818. It will be observed that relative to FIG. 9, there are updated prize states 732A, 733A and 735A for the second column 722, third column 723 and fifth column 724, respectively. In particular, it will be noted that the prize total 732A for the second column 722 is made up of the word "Super"+ the amount 670K to indicate that the prize for that column includes both the value of 670K and the current value of the super jackpot. That is, it will be appreciated that the weighted table for configuring the reel strip associated with this column can include the super jackpot prize. In an example, the super jackpot prize is removed from the weighted table associated with the second column after being selected.

FIG. 10 shows that a configurable symbol 1010 having a value of 20K has been selected. Like FIG. 8, FIG. 11 shows an animation of the fourth prize value 734C to indicate that it will be updated and a diagonally-patterned background 819 has been added to indicate the change to the active position state. FIG. 12 shows the update prize value 734D of "240K" for the fourth column 724.

Figure 9:
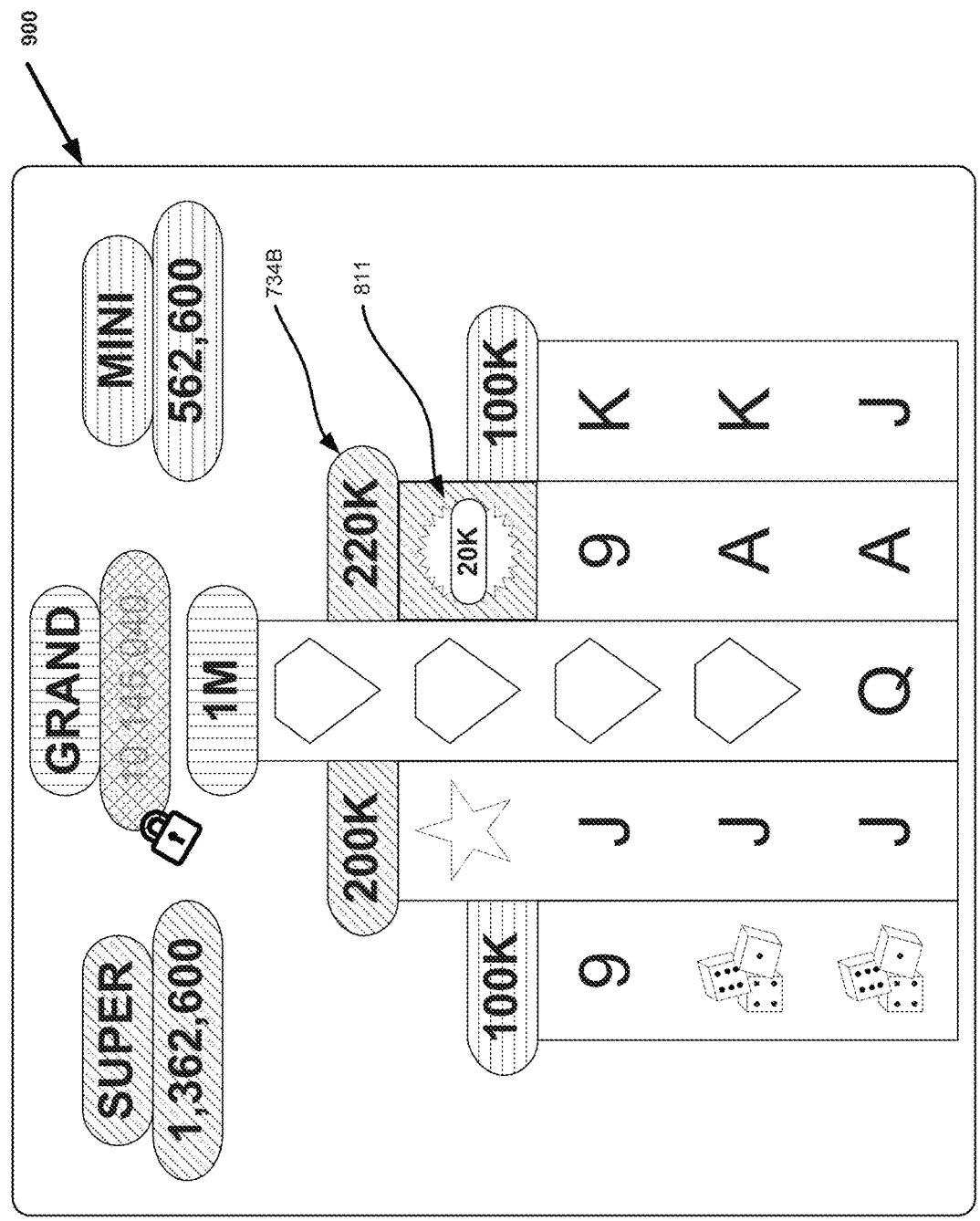
Figure 13:
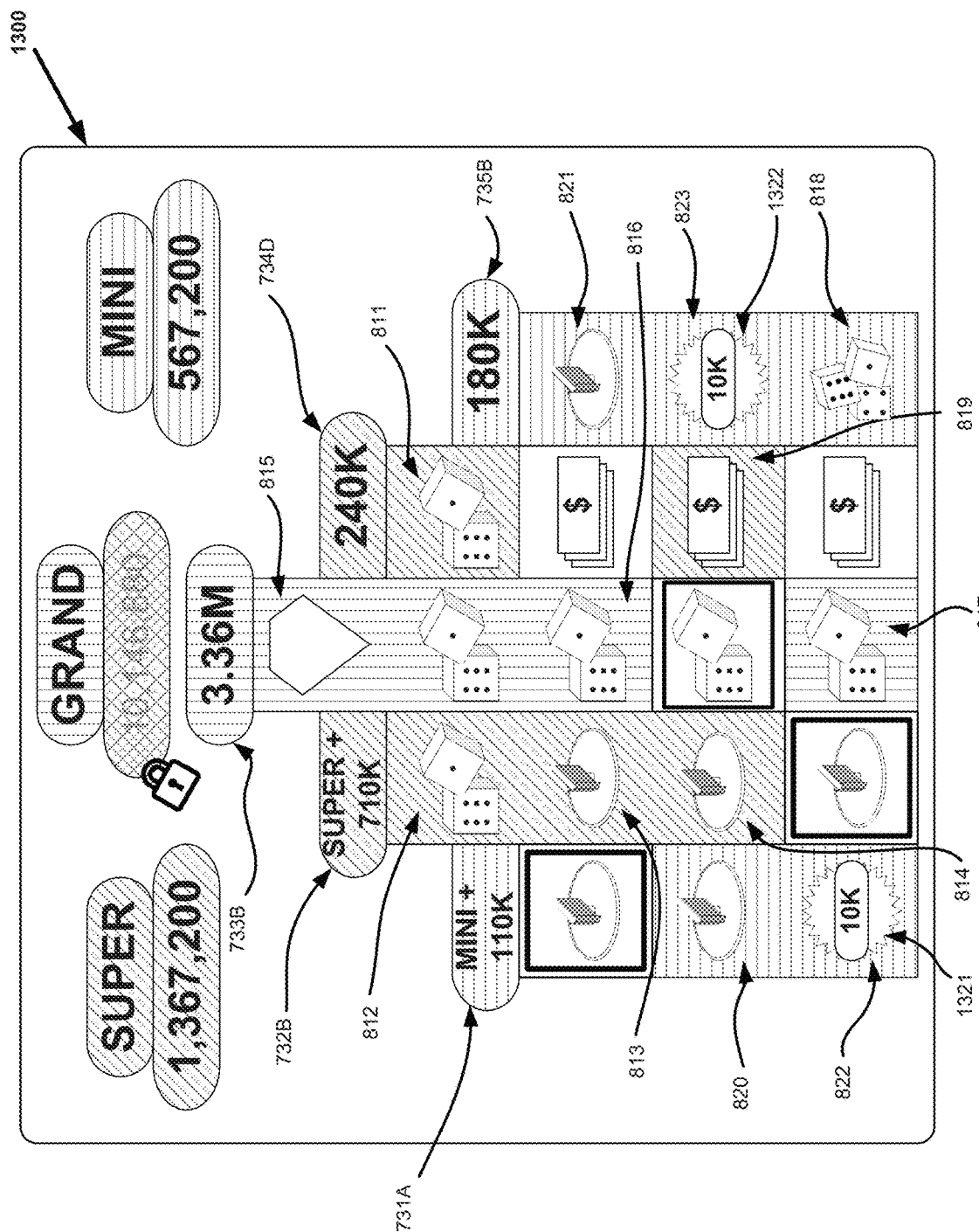

FIG. 13 is an example of a screen display like those of FIGS. 9 and 12 but where an entire column of symbol positions is now active, here the fifth column 725. As exemplified by FIG. 13, prior to configurable symbols 1321, 1322 being selected, symbol positions 811-821 were active. COR symbol 1322 has landed on the previously inactive position and a horizontally patterned background 823 has been added. Accordingly, in this example, at step 545, the processor 204 determines that all positions of a column are active (here the fifth column) and proceeds to step 550 of awarding a prize based on the prize state of the column (here "180K" 735B). In embodiments where the columns have different numbers of symbol positions, some columns require more or fewer activations than other(s) for the column prize to be awarded. In this example, with a 3-4-5-4-3 configuration, the first column 721 and the fifth column 725 each requires 3 activated symbol positions, the second column 722 and the fourth column 724 each has 4 activated symbol positions, and the third column 723 has 5 activated symbol positions. In some instances, the number of required activated symbol positions reflects the amount of the dynamic award value and/or jackpot associated with that column. For example, the first column 721 and the fifth column 725 requiring the least activated symbol positions are associated with the smaller, mini jackpot, whereas the middle column requiring the most activated symbol positions is associated with the greater, grand jackpot.

Figure 14:
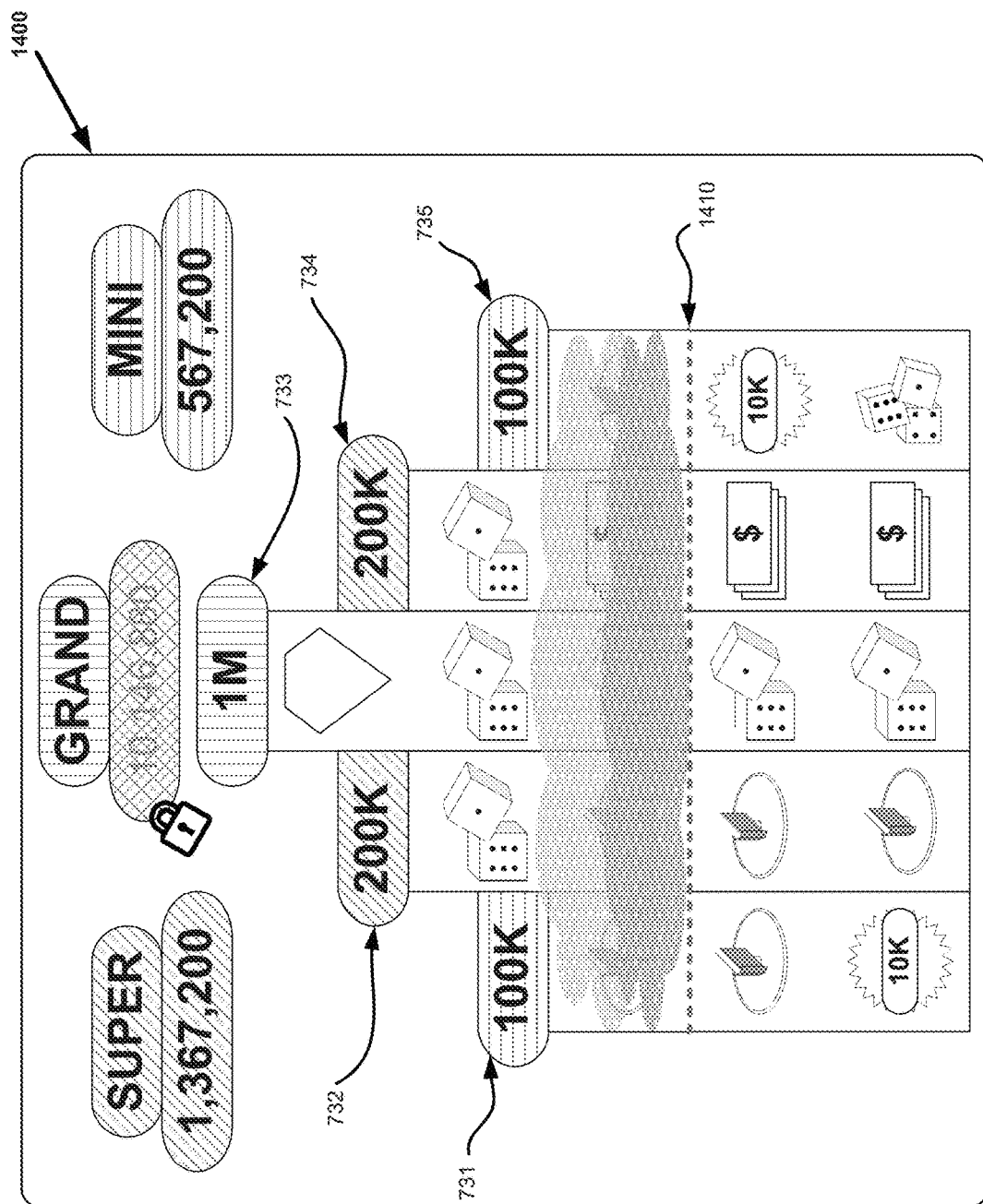

At step 552, the processor reinitializes the active position and prize states, in this example, by resetting the prizes to their base states 731-735 and removing all the backgrounds. Part of the animation by the processor of this process is shown in the screen display of FIG. 14 where a line 1410 moves from the bottom of the columns to the top to "wipe" the background clean.

Figure 15:
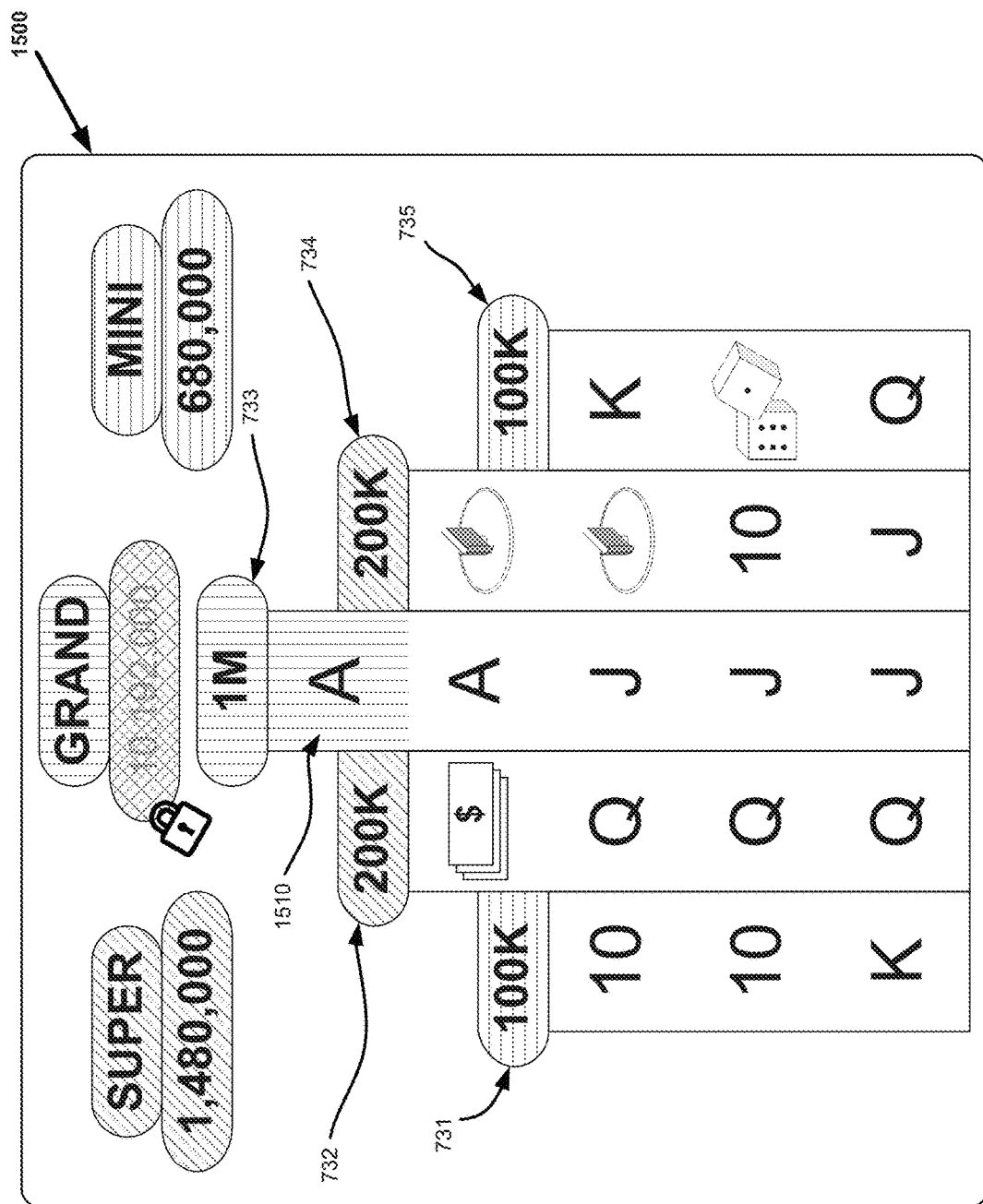

In the example, the values 731-735 are reset to the original values and all the backgrounds are removed (shown with blank backgrounds). In other examples, the starting amounts may vary and/or the starting position state may vary. That is, the processor 204 may determine starting values and/or position states (e.g. using weighted tables). For example, FIG. 15 shows an example screen display where initially one symbol position 1510 is active.

Figure 5:
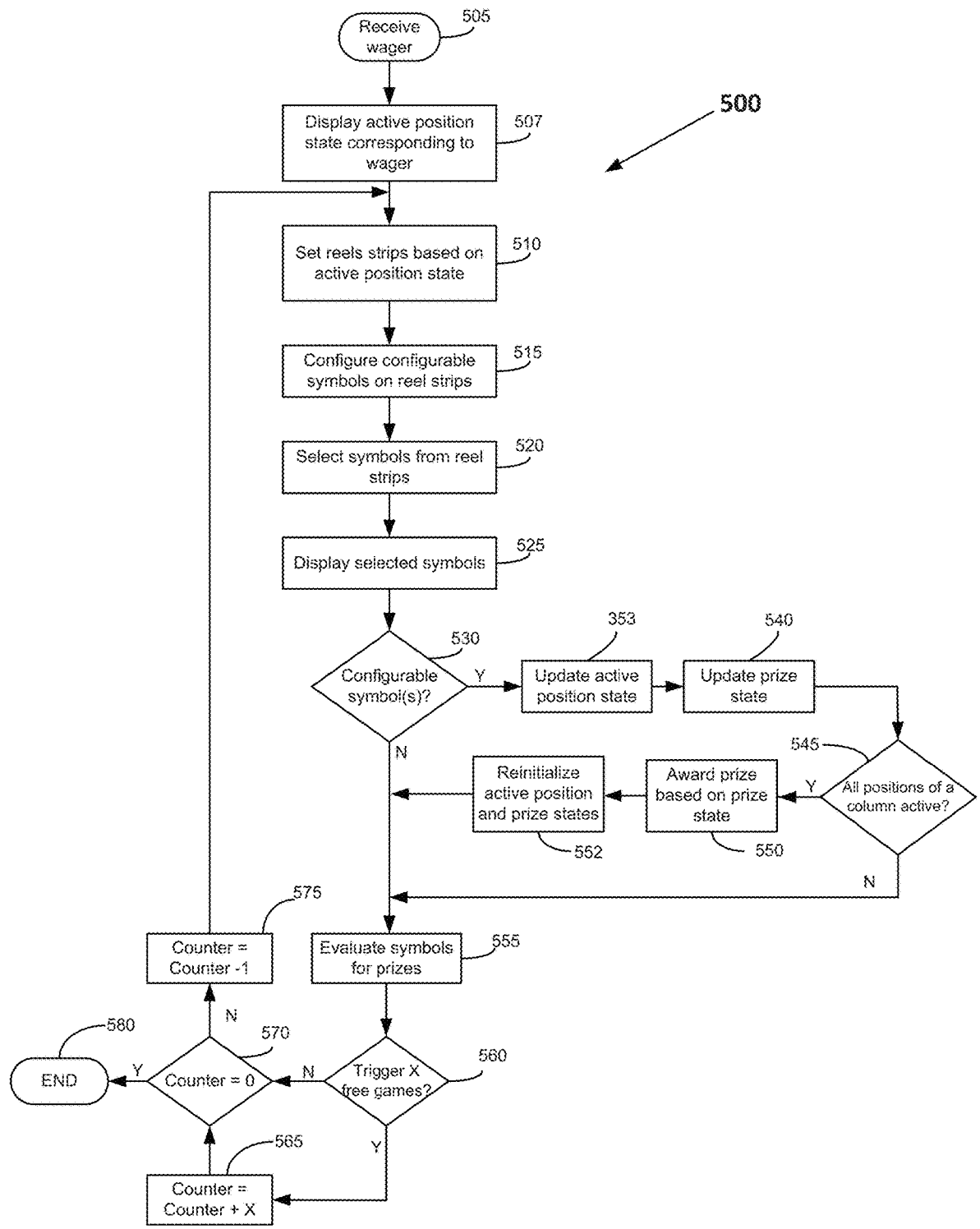
FIG. 5 is a flow chart of an example embodiment of operating a gaming device.

An advantageous aspect of the invention is that as shown in FIG. 5, position activation and prize update can continue during a series of free games instances and carried through back to the base games after the free games instances are complete if not awarded during the free games instances. That is, if the trigger is determined to have occurred at step 565, processor 204 proceeds to step 565 and sets a counter to an initial value of free games, here represented as X, but which may be, for example, 5, 8, or 12 free games. The processor will then proceed, via step 570, to step 575 where the counter is decremented and then iterate through steps 510 to 560 until at step 570 the counter reaches zero.

In an example, in the free games, awards may be enhanced, for example, by multiplying it by a multiplier.

In another example embodiment, the reel strips may have fixed prizes—i.e. are not configured each game.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A gaming device comprising:
    a display; and
    a controller comprising a processor and a memory storing
        (i) a plurality of columns of symbol positions, (ii) a plurality of reel strips corresponding to each of the plurality of columns of symbol positions, each reel strip comprising a first category of symbols and a second category of symbols and being associated with one of the plurality of columns of symbol positions, (iii) an active position state defining which symbol positions of a respective column are currently active; (iv) a prize state for each column, and (v) instructions which, when executed, cause the processor to at least, in a game instance:
    control the display to display the plurality of columns of symbol positions,
    determine a threshold based on a number of symbol positions for each of the plurality of columns of symbol positions having the first category of symbols,
    determine which of the plurality of reel strips to select symbols from for each of the plurality of columns of symbol positions based on the threshold determined to control a probability of activation of a symbol position when the first category of symbols is selected for the symbol position,
    select symbols from the plurality of reel strips determined for the plurality of columns of symbol positions for display in the plurality of columns of symbol positions, based on a random value obtained from a random number generator,
    control the display to display the symbols selected at the plurality of columns of symbol positions,
    upon one or more symbols selected for a first column being the first category of symbols, visually animate each symbol position having a first category symbol as active, and the prize state at the first column to incorporate each prize on each symbol position having the first category symbol,
    upon all of the symbol positions in the first column being active, visually animate a first award based on the prize state associated with the first column, reinitialize the active position state, and reinitialize the prize state of each of the columns,
    evaluate the symbols selected for a winning combination, and
    upon the symbols selected include the winning combination, visually animate incorporating a second award based on the winning combination into the first award.

2. The gaming device of claim 1, wherein the first category of symbols includes one or more configurable symbols and the second category of symbols includes one or more non-configurable symbols, and wherein the instructions, when executed, further cause the processor to at least, in each game instance, assign a prize to each configurable symbol of each reel strip prior to display of the symbols selected for the symbol positions by selecting the prize from a weighted table of prizes associated with the respective reel strip.

3. The gaming device of claim 2, wherein the instructions, when executed, further cause the processor to select the prize from the weighted table of prizes based on one or more random values obtained from the random number generator.

4. The gaming device of claim 2, wherein the instructions, when executed, further cause the processor to remove one or more prizes from the weighted table after the one or more prizes have been assigned.

5. The gaming device of claim 2, wherein the instructions, when executed, further cause the processor not to replace the prize after the prize has been selected.

6. The gaming device of claim 2, wherein the instructions, when executed, further cause the processor to randomly selected the prize from the weighted table based on one or more random values obtained from the random number generator.

7. The gaming device of claim 2, wherein the prize state is represented by a prize value, and wherein the instructions, when executed, further cause the processor to, when updating the prize state, add the prize selected to the prize value to obtain a new prize value.

8. The gaming device of claim 7, wherein the instructions, when executed, further cause the processor to animate the prize selected being added to prize value to obtain the new prize value.

9. The gaming device of claim 2, wherein the game instance is a first game instance in an iterative loop, and wherein the instructions, when executed, further cause the processor to conduct a second game instance using the weighted table associated with a new current reel to assign values to the configurable symbols.

10. The gaming device of claim 1, wherein a first column comprises a first number of symbol positions, and a second column comprising as second and greater number of symbol positions, and wherein at least one prize associated with the second column is larger than any prize associated with the first column.

11. The gaming device of claim 1, wherein there are five columns of symbol positions comprising, from left to right, a first column comprising three symbol positions, a second column comprising four symbol positions, a third column comprising five symbol positions, a fourth column comprising four symbol positions, and a fifth column comprising three symbol positions.

12. The gaming device of claim 11, wherein a first prize is associated with the first and fifth columns, a second prize, larger than the first prize, is associated with the second and fourth columns, and a third prize, larger than the second prize, is associated with the third column.

13. The gaming device of claim 1, wherein a first reel strip and a second reel strip are associated with the first column, wherein the first column includes a number of active symbol positions, and wherein the instructions, when executed, further cause the processor to select the symbols from one of the first reel strip when the number is less than the threshold and the second reel strip when the number is greater than the threshold.

14. The gaming device of claim 13, wherein the instructions, when executed, further cause the processor to configure the second reel strip for use with the one of the plurality of columns of symbol positions so as to have a lower probability of a configurable symbol of the first category being selected than the first reel strip to thereby control a probability of activation of a further symbol position.

15. The gaming device of claim 1, wherein the instructions, when executed, further cause the processor to determine whether a trigger condition is met in respect of each game instance, and responsive to the trigger condition being met, conduct a plurality of additional game instances, wherein in each additional game instance, the instructions, when executed, further cause the processor to at least:
    select a second set of symbols from the plurality of reel strips for display in the plurality of columns of symbol positions based on one or more random values obtained from the random number generator;
    upon one or more symbols selected being the first category symbol, update the active position state to register a respective symbol position for which the first category symbol is selected as active, and update the prize state of a respective column for which the first category symbol is selected to incorporate each prize associated with the first category symbol selected; and
    upon all of the symbol positions of a respective column becoming active, present a third award based on the prize state of the respective column, reinitialize the active position state, and reinitialize the prize state of each of the columns.

16. The gaming device of claim 15, wherein the instructions, when executed, further cause the processor to apply a multiplier to the third award upon the third award being based on the prize state during an additional game instance.

17. The gaming device of claim 1, wherein the instructions, when executed, further cause the processor to, when the processor reinitializes the active position state, determine whether one or more symbol positions are to be set as initially active.

18. The gaming device of claim 1, wherein the instructions, when executed, further cause the processor to, when the processor reinitializes prize state of each of the columns, determine a start-up value of each of the prize states.

19. The gaming device of claim 1, wherein the instructions, when executed, further cause the processor to change a background of a symbol position that displays an active symbol.

20. The gaming device of claim 19, wherein the instructions, when executed, further cause the processor to remove the background of the symbol position when the active position state is reinitialized.

\* \* \* \* \*